United States Patent [19]

Rose

[11] Patent Number: 5,689,329
[45] Date of Patent: Nov. 18, 1997

[54] FLYING HEIGHT ALTITUDE SIMULATOR

[75] Inventor: David Rose, San Diego, Calif.

[73] Assignee: Phase Metrics, San Diego, Calif.

[21] Appl. No.: 698,793

[22] Filed: Aug. 16, 1996

[51] Int. Cl.⁶ .................................................. G01B 11/14
[52] U.S. Cl. ............................................................ 356/72
[58] Field of Search ........................................... 356/72

[56] References Cited

U.S. PATENT DOCUMENTS 3,641,527  2/1972  Gyi ............................................. 360/61
5,552,884  9/1996  Li et al. ..................................... 356/243

Primary Examiner—Vincent P. McGraw
Attorney, Agent, or Firm—Blakely Sokoloff Taylor & Zafman

[57] ABSTRACT

A flying height tester that can vary an air pressure and measure an air bearing height between a slider and a substrate. The substrate is located within a chamber that has an air pressure. The tester includes a loader which places a slider adjacent to the substrate. An optical system computes the air bearing height from a light beam that is directed through the substrate and reflected off of the slider. The chamber is coupled to a pressure control system that can vary the pressure of the air surrounding the slider. The pressure control system varies the pressure to simulate slider operation at various altitudes. The tester of the present invention can thus measure air bearing height while simulating various altitude conditions.

18 Claims, 2 Drawing Sheets

FLYING HEIGHT ALTITUDE SIMULATOR

BACKGROUND OF THE INVENTION

1. Field of the Invention

The present invention relates to a flying height tester for measuring an air bearing height between a substrate and a slider of a hard disk drive.

2. Description of Related Art

Hard disk drives contain a plurality of magnetic transducers that magnetize and sense the magnetic field of a rotating disk. Each transducer is typically integrated into a slider that is mounted to a head gimbal assembly (HGA) of the disk drive. The rotating disk creates an air stream which cooperates with hydrodynamic features of the slider to create an air bearing between the slider and the disk. The air bearing prevents mechanical wear on the disk surface and the slider. The air bearing is designed to be relatively small to maximize the recording efficiency of the transducer.

When mass producing magnetic recording heads it is desirable to test the components to insure that the HGAs create an air bearing that is within operating limits. The air bearing height can be tested with an apparatus commonly referred to as a flying height tester. A flying height tester has a load arm which places a slider adjacent to a rotating glass disk. An optical system then reflects light off of the slider and measures the air bearing height. After the air bearing height is measured a new slider is loaded into the tester and the process is repeated.

Hard disk drives are typically installed into computers which can be used in a variety of different environments. By way of example a computer may be used at a location that is at ground level, or at a location that is above ground level. The variance in altitude will change the air pressure and the air bearing height of the slider.

Air bearing heights are being reduced to the submicroinch range. Any variation in the air pressure and corresponding change in the height of the air bearing may significantly effect the performance of the disk drive. It would be desirable to provide a flying height tester that can vary both the air pressure and measure the air bearing height of a slider.

SUMMARY OF THE INVENTION

The present invention is a flying height tester that can vary an air pressure and measure an air bearing height between a slider and a substrate. The substrate is located within a chamber that has an air pressure. The tester includes a loader which places a slider adjacent to the substrate. An optical system computes the air bearing height from a light beam that is directed through the substrate and reflected off of the slider. The chamber is coupled to a pressure control system that can vary the pressure of the air surrounding the slider. The pressure control system varies the pressure to simulate slider operation at various altitudes. The tester of the present invention can thus measure air bearing height while simulating various altitude conditions.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
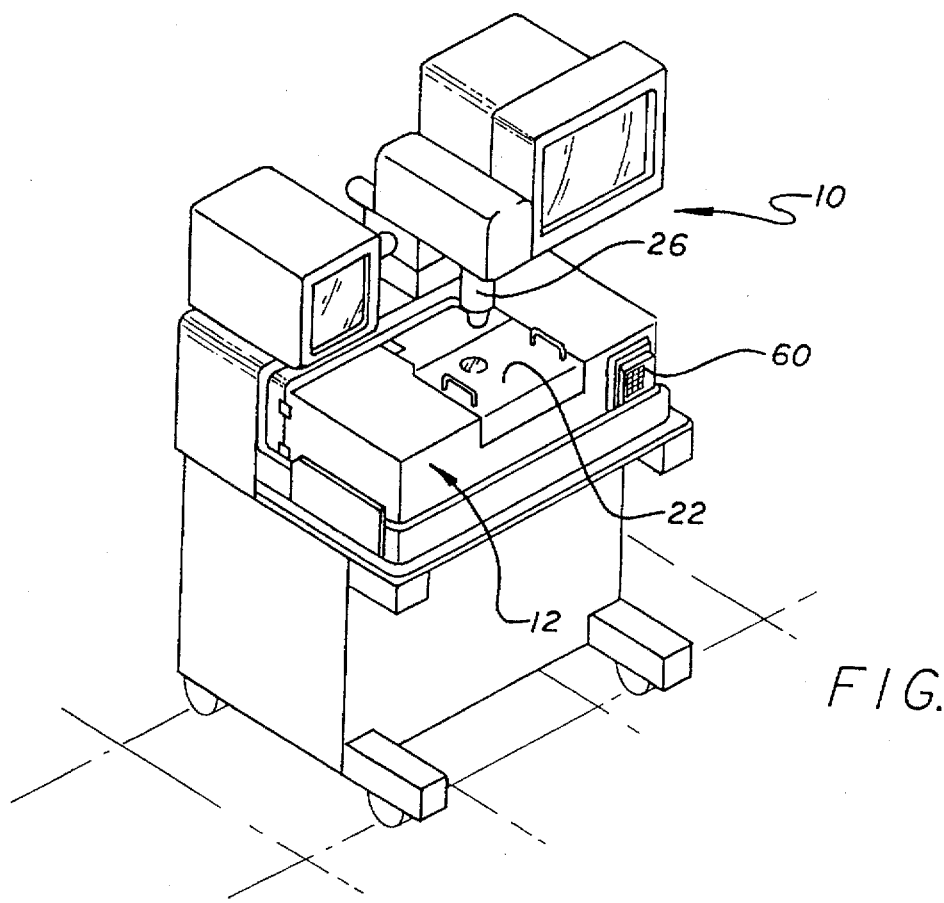
FIG. 1 is a perspective view showing a flying height tester of the present invention.
Figure 2:
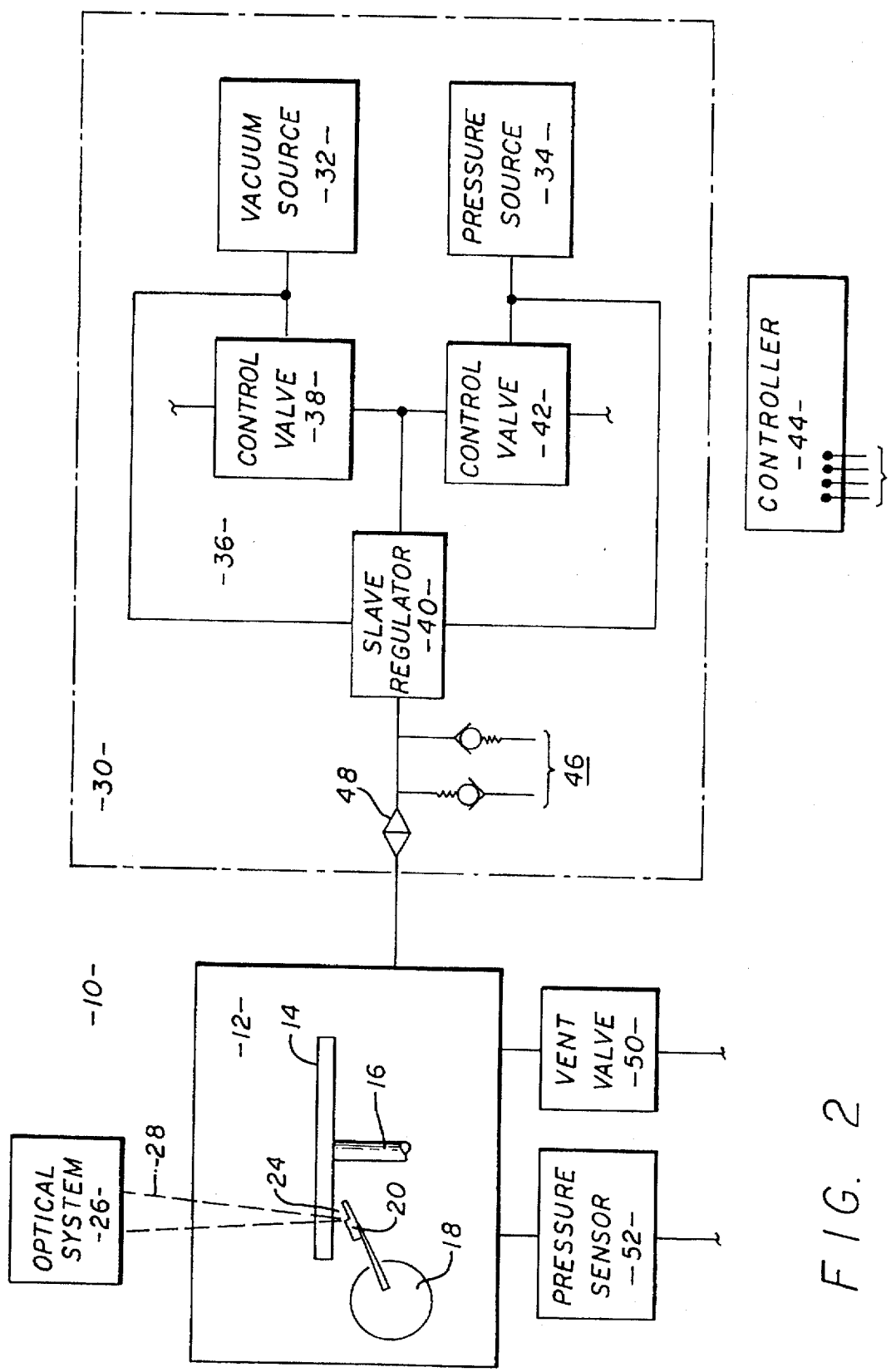
FIG. 2 is a schematic of the flying height tester.

Referring to the drawings more particularly by reference numbers, FIGS. 1 and 2 show a flying height tester 10 of the present invention. The flying height tester 10 can vary the surrounding air pressure of a slider/substrate interface and measure the height of an air bearing between the slider and the substrate to simulate operation at various altitude conditions. The flying height tester 10 of the present invention is thus able to more accurately measure the flying height under true environmental conditions.

The flying height tester 10 may be a modified version of an existing flying height tester sold by Phase Metrics, Inc. of San Diego, Calif. The existing tester is modified to have a pressure chamber 12. The pressure chamber 12 can be constructed by attaching appropriate walls and seals to the existing granite and gantry of the flying height tester. The present invention thus allows existing test equipment to be modified to provide an additional altitude function.

Located within the chamber 12 is a transparent substrate 14 that is rotated by a spindle 16. The tester 10 has a loader 18 which places a slider 20 adjacent to the substrate 14. The chamber 12 has a door 22 so that an operator can load sliders 20 into the tester 10.

An air bearing 24 is created between the slider 20 and the substrate 14. The tester 10 contains an optical system 26 that directs a light beam 28 through the substrate 14. The light beam 28 is reflected off of the slider 20 and back through the substrate 14. The reflected light beam is detected and analyzed to compute the height of the air bearing 24. Although the optical system 26 is shown outside of the chamber 12, it is to be understood that the optical system may be located within the chamber 12.

The tester 10 includes a pressure control system 30 that varies the air pressure within the chamber 12. The air pressure is varied to simulate operation of the slider 18 at different altitudes. The system 30 may be coupled to a source of vacuum 32 and a source of positive pressure 34. The vacuum source 32 and the pressure source 34 may be air flow lines frequently provided at industrial sites.

The pressure system 30 includes a valve control system 36 which controls the flow of air between the vacuum source 32, positive pressure source 34 and the chamber 12. The control system 36 may include a first control valve 38 which has an input port that is coupled to the vacuum source 32, and an output port coupled to a pilot port of a slave pressure regulator 40. The system 36 may further have a second control valve 42 which has an input port coupled to the positive pressure source 34 and an output port coupled to the pilot port of the regulator 40.

The control valves 38 and 42 are connected to a controller 44. The control valves are typically solenoid actuated spool valves which proportionally control a flow of air through the valves as a function of an input signal. The controller 44 provides an analog input current to the control valves to vary the air flow through the valves and create a desired air pressure at the pilot port of the regulator 40. The control valves may be coupled to a pressure sensor and electronic circuitry (not shown) that provide a closed loop feedback to insure that the pilot pressure is at a desired level. The control valves, pressure sensor and electronic circuitry may be a module that is sold by Proportion-Air, Inc. of Indiana under the product designation QB2T.

The regulator 40 has a pair of input ports that are coupled to the vacuum source 32 and the positive pressure source 34, and an output port coupled to the chamber 12. The pressure regulator 40 is a high flow device which has an output pressure that corresponds to the low flow pilot output pressure of the control valves 38 and 42. The controller 44 can change the chamber pressure by varying the currents to the control valves 38 and 42. The variation in current changes the output pressure of the control valves 38 and 42. The change in the pilot pressure varies the output pressure of the slave regulator 40.

The pressure control system may have relief valves 46 and a filter 48 located between the regulator 40 and the chamber 12. The tester 10 may further have a vent valve 50 that is coupled to the chamber 12 and controlled by the controller 44. Additionally, the tester 10 may have an absolute pressure sensor 52 that provides the absolute air pressure within the chamber 12 to the controller 44.

Figure 3:
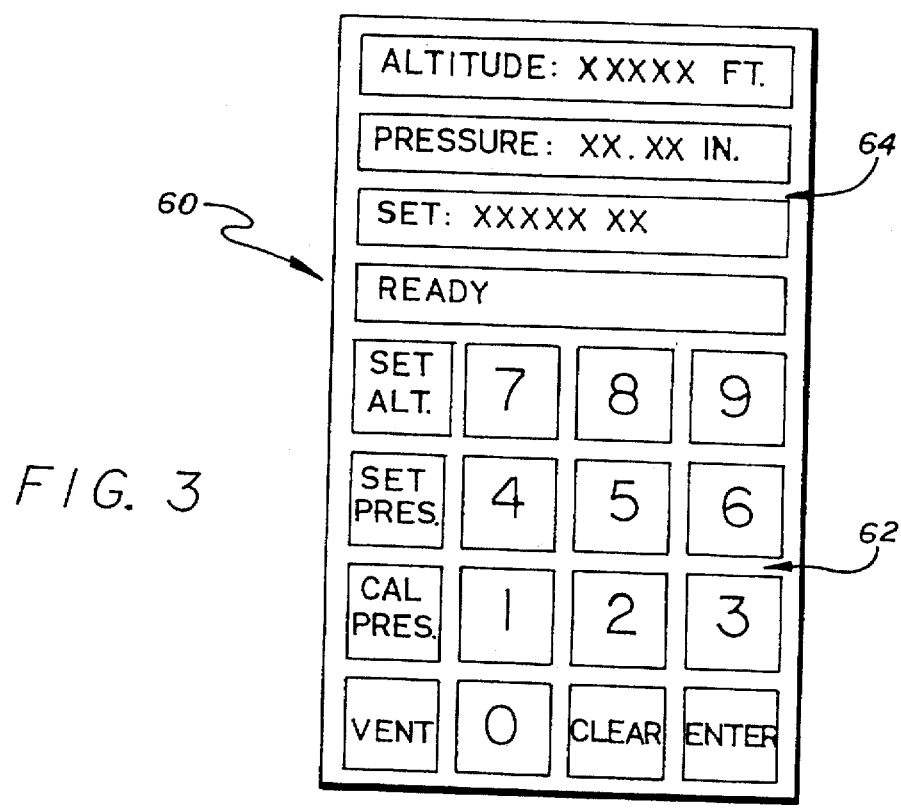
FIG. 3 is a keypad of the flying height tester.

As shown in FIG. 3, the tester 10 may have a keypad 60 that allows an operator to enter input variables for the flying height tester. The keypad 60 includes numeric (0–9), CLEAR and ENTER input keys 62 and an alphanumeric display 64. The keypad 60 may also have function keys, SET ALT, SET PRES, CAL PRES and VENT. The operator can enter the desired pressure at which the flying height test is to be operated by pressing the SET PRES key, entering the pressure and then pressing the ENTER key.

A simulated altitude may be entered by initially pressing the SET ALT key, entering the desired altitude and pressing the ENTER key. The controller 44 may contain an algorithm to convert the altitude to a pressure value. By way of example the controller may utilize the equation $P=29.91(1-6.875\times10^{-6}A)$ mmHg where A is the desired altitude and P is the pressure within the chamber 12. The controller 44 may contain an algorithm that converts the measured chamber pressure back to an altitude that is provided on a visual display. The CAL PRES and SET ALT keys can be simultaneously depressed to enter a correction value to compensate for variations in local atmospheric pressures to insure that the converted altitude value is correct. The chamber 12 can be returned to atmospheric pressure by pressing the VENT key, wherein the controller 44 provides a voltage to open the vent valve 50.

In operation, the operator loads a slider 20 into the tester 10 and enters a desired altitude or pressure through the keypad 60. The controller 44 receives the entered value and provides output signals to the control valves 38 and 42 to vary the air pressure within the chamber 12.

When the chamber reaches the desired air pressure the air flow is terminated and the flying height tester measures the air bearing height between the slider 20 and the substrate 14. The operator may program a variety of altitudes so that the flying height tester measures the air bearing height at a variety of different air pressures. The positive 34 and vacuum 32 pressure sources allow the test to be performed above atmospheric pressure and below atmospheric pressure. Atmospheric pressure being defined as the ambient pressure surrounding the flying height tester.

The pressure level within the chamber 12 can be sensed by the controller 44 through the sensor 52. The controller 44 may provide the sensed air pressures to a data logger (not shown). At the end of the routine the vent valve 50 may be opened to return the chamber 12 to an ambient pressure. The operator can then load another slider 18 into the tester and repeat the routine.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A flying height tester that measures an air bearing height between a slider and a substrate, comprising:

an enclosed chamber that is larger than the slider, said chamber having an inner pressure;

a substrate located within said enclosed chamber;

a loader which places the slider adjacent to said substrate;

an optical system which reflects a light beam off of the slider to measure the air bearing height; and, a pressure control system which varies the inner pressure of said chamber.

2. The tester as recited in claim 1, wherein said pressure control system varies the inner chamber pressure below an ambient pressure.

3. The tester as recited in claim 1, wherein said pressure control system varies the inner chamber pressure above the ambient pressure.

4. The tester as recited in claim 1, wherein said pressure control system includes a valve control system that is coupled to a source of vacuum and a source of positive pressure.

5. The tester as recited in claim 4, wherein said valve control system includes a controller that is coupled to a first control valve and a second control valve to control an amount of air flow from the vacuum source and the positive pressure source to said chamber.

6. The tester as recited in claim 5, wherein said controller includes an input device that allows an operator to enter a pressure level.

7. The tester as recited in claim 6, wherein said controller and said input device allow an operator to enter an altitude that is converted into a pressure level.

8. The tester as recited in claim 5, wherein said valve control system includes a slave pressure regulator that is piloted by said first and second control valves to control the air flow between the vacuum source, the positive pressure source and said chamber.

9. The tester as recited in claim 1, wherein said chamber includes a door.

10. A flying height tester that is coupled to a source of vacuum and a source of positive pressure, and which measures an air bearing height between a slider and a substrate, comprising:

an enclosed chamber that is larger than the slider, said chamber having an air pressure;

a substrate located within said chamber;

a loader which places the slider adjacent to said substrate;

an optical system which reflects a light beam off of the slider to measure the air bearing height;

a first control valve that is coupled to the vacuum source to provide a pilot air pressure;

a second control valve that is coupled to the positive pressure source to vary the pilot air pressure;

a slave pressure regulator that is coupled to the vacuum source and the positive pressure source and which is controlled by the pilot air pressure to provide a flow of air between the vacuum source, the positive pressure source and said chamber; and, a controller that provides output signals to said first and second control valves to vary the pilot air pressure and the air pressure within said chamber.

11. The tester as recited in claim 10, wherein said controller includes an input device that allows an operator to enter a pressure level.

12. The tester as recited in claim 11, wherein said controller and said input device allow an operator to enter an altitude that is converted into a pressure level.

13. The tester as recited in claim 12, wherein said chamber includes a door.

14. The tester as recited in claim 13, wherein said pressure control system varies the air pressure below a local atmospheric pressure.

15. The tester as recited in claim 14, wherein said pressure control system varies the air pressure above the local atmospheric pressure.

16. A method for measuring an air bearing height between a slider and a substrate, comprising the steps of:

a) placing the slider adjacent to a substrate that is located within an enclosed chamber, wherein said chamber is larger than the slider and has an inner pressure;

b) varying the inner chamber pressure of said enclosed chamber; and, c) measuring the air bearing height.

17. The method as recited in claim 16, wherein the inner chamber pressure is reduced to a level below a local atmospheric pressure.

18. The method as recited in claim 16, wherein the inner chamber pressure is increased to a level above the local atmospheric pressure.

* * * * *

US005689329C1

(12) EX PARTE REEXAMINATION CERTIFICATE (6672nd)

United States Patent
Rose

(10) Number: US 5,689,329 C1
(45) Certificate Issued: Feb. 24, 2009

(54) FLYING HEIGHT ALTITUDE SIMULATOR

(75) Inventor: David Rose, San Diego, CA (US)

(73) Assignee: U.S. Trust Company of New York, New York, NY (US)

Reexamination Request:
No. 90/008,498, Apr. 10, 2007

Reexamination Certificate for:
Patent No.: 5,689,329
Issued: Nov. 18, 1997
Appl. No.: 08/698,793
Filed: Aug. 16, 1996

(51) Int. Cl.
*G11B 33/10* (2006.01)
*G11B 33/00* (2006.01)
*G11B 21/21* (2006.01)
*G11B 5/60* (2006.01)
*G11B 33/14* (2006.01)
*G11B 7/22* (2006.01)

(52) U.S. Cl. ......................................... 356/72
(58) Field of Classification Search .................. None
See application file for complete search history.

(56) References Cited

U.S. PATENT DOCUMENTS

| 2,439,806 A | 4/1948 | Heineman |
| 3,631,878 A | 1/1972 | Horst |
| 3,996,793 A | 12/1976 | Topper |
| 5,314,541 A | 5/1994 | Saito et al. |

FOREIGN PATENT DOCUMENTS

EP 0080849 1/1988

OTHER PUBLICATIONS

Tseng, R.C., "Rarefaction effects of gas lubricated bearings in a magnetic recording disk file," J. of Lub. Tech., Series F, No. 4, pp. 624–629, 1975.
Sereny, A, and Castelli, V., "Experimental investigation of slider gas bearings with ultra thin films," J. of Lub. Tech., vol. 101, pp. 510–515, 1979.
Kumaran, A.R., et al, Interaction of ambient pressure and steady state performance characteristics of gas lubricated sliders, Trib. Mech. Mag. Stor. Sys., vol. 6, SP–26 1988.
Kato, T et al., "High density perpendicular recording at very low flying height under rarefied pressure condition," IEEE Trans. Mag., 25(5), pp. 2433–2435, 1990.

*Primary Examiner*—James Menefee

(57) ABSTRACT

A flying height tester than can vary an air pressure and measure an air bearing height between a slider and a substrate. The substrate is located within a chamber that has an air pressure. The tester includes a loader which places a slider adjacent to the substrate. An optical system computes the air bearing height from a light beam that is directed through the substrate and reflected off of the slider. The chamber is coupled to a pressure control system that can vary the pressure of the air surrounding the slider. The pressure control system varies the pressure to simulate slider operation at various altitudes. The tester of the present invention can thus measure air bearing height while simulating various altitude conditions.

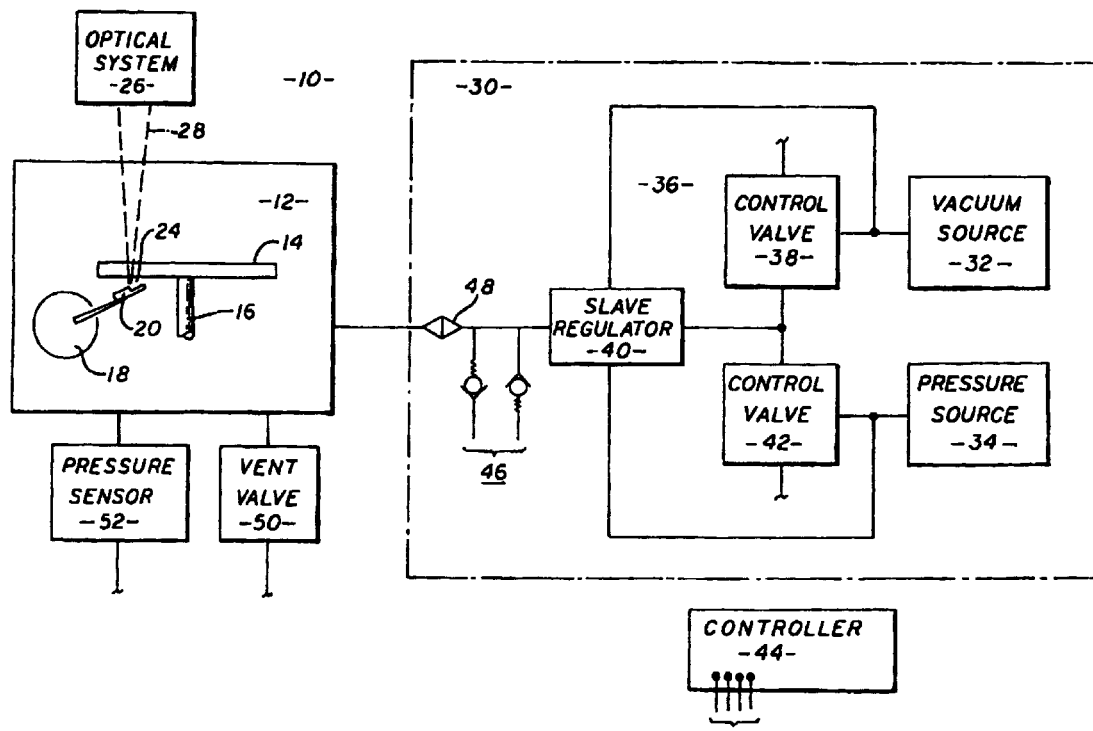

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–18 are cancelled.

* * * * *